United States Patent [19]

James et al.

[11] Patent Number: 5,432,050

[45] Date of Patent: * Jul. 11, 1995

[54] PHOTOGRAPHIC ELEMENT HAVING A TRANSPARENT MAGNETIC RECORDING LAYER

[75] Inventors: Robert O. James, Rochester; Lawrence A. Rowley, Macedon; Joseph A. Verdone; Ronald M. Wexler, both of Rochester, all of N.Y.

[73] Assignee: Eastman Kodak Company, Rochester, N.Y.

[ * ] Notice: The portion of the term of this patent subsequent to Jun. 27, 2012 has been disclaimed.

[21] Appl. No.: 193,349

[22] Filed: Feb. 8, 1994

[51] Int. Cl.$^6$ .................... G03C 1/76; G11B 5/708
[52] U.S. Cl. .................... 430/496; 430/501; 430/140; 430/523; 428/694 B; 428/694 BG; 428/694 BU; 428/694 BY; 428/694 BR; 428/694 BN; 428/694 BA
[58] Field of Search .......... 430/496, 501, 140, 523; 428/694 B, 694 BG, 694 BU, 694 BY, 694 BS, 694 BR, 694 BN, 694 BA

[56] References Cited

U.S. PATENT DOCUMENTS

| | | | |
|---|---|---|---|
| 3,782,947 | 1/1974 | Krall | 430/495 |
| 4,279,945 | 7/1981 | Audran et al. | 430/140 |
| 4,584,243 | 4/1986 | Kadokura et al. | 428/694 BN |
| 4,590,127 | 5/1986 | Hashimoto et al. | 428/694 BP |
| 4,671,993 | 6/1987 | Kadokura et al. | 428/694 BN |
| 4,687,703 | 8/1987 | Miyoshi et al. | 428/694 BN |
| 4,687,704 | 8/1987 | Miyoshi et al. | 428/694 BN |
| 4,689,265 | 8/1987 | Miyoshi et al. | 428/694 BN |
| 4,731,278 | 3/1988 | Ryoke et al. | 428/694 BN |
| 4,756,962 | 7/1988 | Takamatsu et al. | 428/694 BN |
| 4,803,121 | 2/1989 | Ryoke et al. | 428/694 BN |
| 4,990,276 | 2/1991 | Bishop et al. | 430/523 |
| 5,035,856 | 7/1991 | Koyama et al. | 428/694 BN |
| 5,035,948 | 7/1991 | Saito et al. | 428/694 BN |
| 5,080,967 | 1/1992 | Noguchi et al. | 428/694 BN |
| 5,084,335 | 1/1992 | Nakano et al. | 428/694 BN |
| 5,147,768 | 9/1992 | Sakakibara | 430/501 |
| 5,217,804 | 6/1993 | James et al. | 428/694 BA |
| 5,229,259 | 7/1993 | Yokota | 430/523 |
| 5,252,441 | 10/1993 | James et al. | 430/496 |

*Primary Examiner*—Charles L. Bowers, Jr.
*Assistant Examiner*—Mark F. Huff
*Attorney, Agent, or Firm*—Robert A. Gerlach

[57] ABSTRACT

A photographic element comprising a support having provided thereon a light-sensitive layer and a transparent magnetic recording layer, the magnetic recording layer comprising a transparent polymeric binder, ferromagnetic particles and reinforcing filler particles, the magnetic particles having a surface area greater than 30 m$^2$/gm and a coverage of from about $1 \times 10^{-11}$ mg/$\mu$m$^3$ to about $1 \times 10^{-10}$ mg/$\mu$m$^3$, the filler particles having a median diameter less than 0.15 $\mu$m, a Mohs hardness of at least 6 and being present in the transparent magnetic layer in an amount of about 20% to about 300% by weight based on the weight of the polymeric binder present.

46 Claims, No Drawings

PHOTOGRAPHIC ELEMENT HAVING A TRANSPARENT MAGNETIC RECORDING LAYER

BACKGROUND OF THE INVENTION

1. Field of the Invention

This invention relates to photographic elements and more particularly to photographic elements having a light-sensitive silver halide layer and a transparent magnetic recording layer.

2. Description of Related Art

It is known from various U.S. patents, including: U.S. Pat. Nos. 3,782,947; 4,279,945; 4,990,276; 5,217,804; 5,147,768; 5,229,259, and others; to include in a light-sensitive silver halide photographic element a transparent magnetic recording layer. Such elements are advantageous because they can be employed to record images by the customary photographic process while at the same time information can be recorded into and read from the magnetic recording layer by the techniques similar to that employed in the magnetic recording art.

A difficulty, however, arises in that magnetic recording layers generally employed in the magnetic recording industry are opaque, not only because of the nature of the magnetic particles, but also because of the requirements that the recording layer contains other additives which further create problems with regard to the optical characteristics of the layer. Thus, the nature and quantity of any materials added to the magnetic recording layer must not interfere with the optical characteristics of the layer. Also, the requirements of recording and reading of the magnetic signal from a transparent magnetic layer present on a photographic element are more stringent than that found in conventional magnetic recording because of the loading of the magnetic particles in the transparent magnetic layer and the nature of the photographic element.

That is, the presence of the magnetic recording layer cannot interfere with the primary function of the photographic element which is to achieve realistic reproductions of the original image. In addition, the magnetic recording layer must be capable of accurately recording the information applied thereto and reading out the information on demand. This is particularly difficult because the loading of the magnetic particles in the transparent layer must be such as to not interfere with the quality of the photographic elements.

Finally, the photographic element and particularly the transparent magnetic recording layer provided thereon must be capable of repeated use in both the recording and reading mode and, therefore, must be durable, abrasion resistant and scratch resistant so as not to adversely affect the quality of the photographic element. For example, during the residence of the film in a camera, entries may be made to the magnetic recording layer for every exposure, and an indeterminate number of read operations are conducted depending on the particular application to which the film is used. This also is true in the processing of the film and in subsequent use of the processed film for additional copies, enlargements and the like.

These requirements are exacerbated by the curl present in photographic elements as a result of the presence of the hydrophilic layers and the core set from being tightly wound on small mandrels. A consequence of the curl is that much higher pressures on the photographic element than employed in coventional magnetic recording and particularly on the magnetic layer must be employed to flatten the magnetic layer and hold it tightly against the magnetic recording and reading heads. This high pressure coupled with the speed at which the element moves past the head causes unusually high stress in the magnetic recording layer rendering it susceptible to failure.

It can, therefore, be readily seen that it is highly desirable to provide photographic elements having a transparent magnetic recording layer exhibiting improved magnetic and photographic performance as well as improved running durability, abrasion resistance and scratch resistance. This goal is extremely difficult to achieve because of the nature and concentration of the magnetic particles required to provide sufficient signal to write and read magnetically stored data, the effect of any noticeable color, haze, or grain associated with the magnetic layer on the photographic layers and the effect of the magnetic layer on the optical density and granularity of the photographic layers. Thus, all of these various characteristics must be considered both independently and cumulatively in order to arrive at a commercially viable photographic element containing a transparent magnetic recording layer that will withstand repeated and numerous passages through the recording and reading zones of a suitable apparatus.

SUMMARY OF THE INVENTION

The invention provides an improved photographic element including a support, having provided thereon a light-sensitive layer and a transparent magnetic recording layer, the magnetic recording layer comprising a transparent polymeric binder, ferro-magnetic particles and reinforcing filler particles, the magnetic particles having a surface area greater than 30 m$^2$/gm and a coverage of from about $1 \times 10^{-11}$ mg/$\mu$m$^3$ to about $1 \times 10^{-10}$ mg/$\mu$m$^3$, ($\mu$m = 10$^{-6}$ meter) the filler particles having a median diameter on a weight basis of less than 0.15 $\mu$m and a Mohs hardness of at least 6, the filler particles being present in the magnetic layer in an amount of from 20 to 300 percent based on the weight of the polymeric binder present. Because of the requirement that the magnetic layer be transparent in the photographic sense, it was highly unexpected to find that the addition of further particulate material to the magnetic recording layer could be achieved without interfering with the photographic properties of the element while at the same time achieving substantial increase in head cleaning, running durability, abrasion resistance and scratch resistance of the element.

DETAILED DESCRIPTION OF THE INVENTION

In the preparation of a photographic element having a transparent magnetic recording layer, the magnetic particles have a surface area greater than 30 m$^2$/gm and preferably greater than 40 m$^2$/gm. The coverage of the magnetic particles in the magnetic recording layer varies within the ranges given above depending upon the thickness of the magnetic recording layer. For optimum performance, the magnetic recording layer should be such that normal wear will not result in signal loss after multiple reading and writing operations. However, the layer must not be so thick as to interfere with the photographic properties of the film.

The reinforcing filler particles have a median diameter less than 0.15 $\mu$m, preferably less than 0.1 $\mu$m and most preferably less than 0.08 $\mu$m. As a practical matter, the minimum median diameter is 0.04 μm. The filler particles have a Mohs hardness greater than 6 and are present in an amount of from 20 to 300 percent by weight and preferably from 50 to 120 percent and most preferably from 65 to 85 percent based on the weight of the binder. It was quite unexpected that such high quantities of additional particulate material could be present in the magnetic recording layer without affecting the transparency thereof in a photographic sense and at the same time increase the durability of the layer when running under high pressure against various surfaces.

The magnetic particles are present in the magnetic recording layer in an amount of from about 2.5 to about 10 percent by weight based upon the weight of the binder.

In accordance with this invention, the transparent magnetic layer is prepared by initially forming a high solids content magnetic concentrate by mixing the magnetic particles in a suitable grind solvent together with suitable surfactants and milling in a device such as, for example, a ball mill, a roll mill, a high speed impeller mill, media mill, an attritor or a sand mill. Milling proceeds for a sufficient time to ensure that substantially no agglomerates of the magnetic particles remain. The high solids magnetic concentrate is next diluted with suitable solvents and polymeric stabilizers to maintain the particles in an unagglomerated state (subsequently referred to as the intermediate letdown). Mixing for an additional period of time is continued in order to polish the ingredients.

In a separate container, the binder polymer is dissolved in a suitable solvent. To this solution is added the intermediate letdown in accordance with the procedure set forth above and stirring is continued. A dispersion of the reinforcing filler particles and other addenda is prepared by milling to break up agglomerates and this is added to the mixer containing the binder solution and intermediate letdown. This dispersion may be coated onto a suitable support in its present form or additional and optional ingredients such as, crosslinking agents, catalysts, coating aids, lubricants and the like, may be added before the coating operation.

The coating composition is applied to a suitable support which may contain additional layers for promoting adhesion, by any suitable coating device including slot die hoppers, slide hoppers, gravure coaters, reverse roll coaters and the like.

The magnetic layer may also be coated over or overcoated with conventional layers including antistats, protective overcoats, lubricants and the like. However, the preferred configuration of layers is that an antistat layer is beneath the magnetic layer (closer to the support) and the magnetic layer is overcoated with a protective layer and/or a lubricating layer.

Any suitable support may be employed in the practice of this invention, such as, cellulose derivatives including cellulose diacetate, cellulose triacetate, cellulose propionate, cellulose butyrate, cellulose acetate-propionate and the like; polyamides; polycarbonates; polyesters, particularly polyethylene terephthalate, poly-1,4-cyclohexanedimethylene terephthalate, polyethylene 1,2-diphenoxyethane-4,4'-dicarboxylate, polybutylene terephthalate and polyethylene naphthalate; polystyrene, polypropylene, polyethylene, polymethylpentene, polysulfone, polyethersulfone, polyarylates, polyether imides and the like. Particularly preferred supports are polyethylene terephthalate, polyethylene naphthalate and the cellulose esters particularly cellulose triacetate.

Thickness of supports used in the present invention is from 50 μm to 180 μm, preferably, 85 to 125 microns. In addition, various dyes may be formulated into the support or the magnetic layer to give neutral density.

Depending upon the nature of the support, suitable transparent tie or undercoat layers may be desired. Particularly with regard to polyester supports, primers are used in order to promote adhesion. Any suitable primer in accordance with those described in the following U.S. patents maybe employed: U.S. Pat. Nos. 2,627,088; 3,501,301; 4,689,359; 4,363,872; and 4,098,952. Each of these are incorporated herein by reference in their entirety.

The ferromagnetic pigments comprise ferromagnetic iron oxides, such as $\gamma$-$Fe_2O_3$, $Fe_3O_4$ or $\gamma$-$Fe_2O_3$ or $Fe_3O_4$ with Co, Zn or other metals in solid solution or surface treated, or ferromagnetic chromium dioxides, such as $CrO_2$ or $CrO_2$ with metallic elements, for example Li, Na, Sn, Pb, Fe, Co, Ni and Zn, or halogen atoms in solid solution. Ferromagnetic metal pigments with an oxide coating on their surface to improve their chemical stability or to improve dispersibility, as is commonly used in conventional magnetic recording, may also be used in accordance with the invention. In addition, magnetic oxides with a thicker layer of lower refractive index oxide or other material having a lower optical scattering cross-section as taught in U.S. Pat. Nos. 5,217,804 and 5,252,444 may also be used. Cobalt surface treated iron oxide is the preferred ferromagnetic material for use in accordance with this invention.

Examples of the reinforcing filler particles include nonmagnetic inorganic powders with a Mohs scale hardness of at least 6. Specific examples are metal oxides such as $\gamma$-aluminum oxide, chromium oxide ($Cr_2O_3$), iron oxide (alpha-$Fe_2O_3$), tin oxide, doped tin oxide, such as antimony or indium doped tin oxide, silicon dioxide, alumino-silicate and titanium dioxide; carbides such as silicon carbide and titanium carbide; and diamond in fine powder. Gamma aluminum oxide and silicon dioxide are preferred. The important feature is that the filler particles have the particle size and are used in the amounts expressed above.

The binders used in the magnetic layer include, for example, vinyl chloride-vinyl acetate copolymers, vinyl chloride-vinyl acetate-vinyl alcohol copolymers, vinyl chloride-vinyl acetate-maleic acid polymers, vinyl chloride-vinylidene chloride copolymers, vinyl chloride-acrylonitrile copolymers, acrylic ester-acrylonitrile copolymers, acrylic estervinylidene chloride copolymers, methacrylic estervinylidene chloride copolymers, methacrylic esterstyrene copolymers, thermoplastic polyurethane resins, phenoxy resins, polyvinyl fluoride, vinylidene, chloride-acrylonitrile copolymers, butadieneacrylonitrile copolymers, acrylonitrile-butadieneacrylic acid copolymers, acrylonitrile-butadienemethacrylic acid copolymers, polyvinyl butyral, polyvinyl acetal, cellulose derivatives, styrenebutadiene copolymers, polyester resins, phenolic resins, epoxy resins, thermosetting polyurethane resins, urea resins, melamine resins, alkyl resins, urea-formaldehyde resins and the like. Of the above, the cellulose derivatives are the preferred binders for use in accordance with this invention. Cellulose derivatives include cellulose esters such as, for example, cellulose acetate, cellulose diacetate, cellulose triacetate, cellulose acetate butyrate, cellulose acetate propionate, and the like. The most preferred binder is cellulose diacetate. For crosslinking of the binder with isocyanates, the binder should contain active hydrogen atoms as determined by the Zerewitinoff test, such active hydrogen atoms including —OH, —NH$_2$ —NHR, where R is an organic radical, and the like, as described in U.S. Pat. No. 3,479,310.

A dispersing agent, sometimes referred to as a wetting agent or a surface active agent, can be present in the dispersion to facilitate dispersion of the magnetic and/or filler particles and/or wetting of the particles with the dispersing medium. This helps to further minimize agglomeration of the magnetic and/or filler particles. The dispersing agent can be present in the dispersion in an amount up to about 0.02%, preferably 0.001 to 0.01%, by weight. Useful dispersing agents include fatty acid amines, polyvinyl pyrrolidone, polyvinyl alcohol and commercially available wetting agents such as Witco Emcol CC59 which is a quaternary amine available from Witco Chemical Corp. Rhodafac PE 510, Rhodafac RE 610, Rhodafac RE 960, and Rhodafac LO 529 which are phosphoric acid esters available from Rhone-Poulenc, Solsperse 13000 and 17000, poly (C$_{2-4}$-alkyleneimine) carrying at least two mono- or poly-(carbonyl-C$_{1-7}$-alkyleneoxy) groups sold by Zeneca-Inc. (ICI) under the trade designation Solsperse 24000 described in U.S. application Ser. No. 08/173,793, filed Dec. 22, 1993 by some of the same applicants as this application and assigned to the same assignee as this application, which is incorporated herein in its entirety by reference. Other constituents of the coating composition including grind solvents, coating aids, and solvents for the binder are included. Suitable grind solvents include, for example, an ester of an acid such as phthalic acid. Preferred esters are dialkylesters of phthalic acid, the alkyl portion of which can contain from 1 to about 12, preferably 4 to 8, carbon atoms. Exemplary useful esters include dimethyl phthalate, diethyl phthalate, dioctyl phthalate, dipropyl phthalate, and dibutyl phthalate as disclosed in U.S. Pat. No. 4,990,276 issued to Bishop et al. and assigned to the same assignee as this application.

Suitable coating aids include nonionic fluorinated alkyl esters such as, FC-430, FC-431 sold by Minnesota Mining and Manufacturing Co., polysiloxanes such as, Dow Corning DC 1248, DC 200, DC 510, DC 190 sold by Dow Corning and BYK 310, BYK 320, and BYK 322 sold by BYK Chemie and SF 1079, SF 1023, SF 1054 and SF 1080 sold by General Electric.

Organic solvents are normally used for the preparation of the dispersion. Examples of suitable solvents are ketones, such as acetone, methyl ethyl ketone and cyclohexanone, alcohols, esters, such as ethyl acetate and butyl acetate, cellosolves, such as, propylene glycol methyl ether, ethers, such as tetrahydrofuran aromatic solvents, such as toluene, and chlorinated hydrocarbons as solvents, such as carbon tetrachloride, chloroform, dichloromethane; tetrahydrofuran and the ketoesters of U.S. Ser. No. 08/173,833 filed Dec. 22, 1993, entitled *Coating Compositions For A Transparent Magnetic Recording Layer*, by R. M. Wexler and assigned to the same assignee as the immediate application, which are preferred.

Preferably, the binder in the magnetic layer is crosslinked employing any suitable crosslinking agent such as, for example, organic isocyanates; aziridines, as taught in U.S. Pat. No. 4,225,665; and melamines such as methoxymethylmelamine, and the like as set forth in U.S. Pat. No. 5,198,499 to Anderson et al. issued Mar. 30, 1993 and assigned to the same assignee as this application.

Any suitable organic polyisocyanate can be used as the crosslinking agent such as, tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the foregoing, polyisocyanates prepared by reacting an excess of an organic diisocyanate with an active hydrogen containing compounds such as polyols, polyethers and polyesters and the like including ethylene glycol, propylene glycol, dipropylene glycol, butylene glycol, trimethylol propane, hexanetriol, glycerine, sorbitol, pentaerythritol, caster oil, ethylenediamine, hexamethylenediamine, ethanolamine, diethanolamine, triethanolamine, water, ammonia, urea and the like, including biuret compounds, allophanate compounds and the like. The preferred polyisoyanates employed as a crosslinking agent is the reaction product of trimethylol propane and 2,4-tolylene diisocyanate sold by Mobay under the trade designation Mondur CB 75.

In another embodiment of the invention, the magnetic recording layer is applied over an antistat layer which is employed to dissipate static charges.

A very wide variety of antistatic layers are known for use in photographic elements. For example, an antistatic layer comprising an alkali metal salt of a copolymer of styrene and styrylundecanoic acid is disclosed in U.S. Pat. No. 3,033,679. Photographic films having a metal halide, such as sodium chloride or potassium chloride, as the conducting material, in a hardened polyvinyl alcohol binder are described in U.S. Pat. No. 3,437,484. In U.S. Pat. No. 3,525,621, the antistatic layer is comprised of colloidal silica and an organic antistatic agent, such as an alkali metal salt of an alkylaryl polyether sulfonate, an alkali metal salt of an arylsulfonic acid, or an alkali metal salt of a polymeric carboxylic acid. An antistatic layer comprised of an anionic film forming polyelectrolyte, colloidal silica and a polyalkylene oxide is disclosed in U.S. Pat. No. 3,630,740. In U.S. Pat. No. 3,681,070, an antistatic layer is described in which the antistatic agent is a copolymer of styrene and styrene sulfonic acid. U.S. Pat. No. 4,542,095 describes antistatic compositions comprising a binder, a nonionic surface-active polymer having polymerized alkylene oxide monomers and an alkali metal salt. In U.S. Pat. No. 4,916,011, an antistatic layer comprising a styrene sulfonate-maleic acid copolymer, a latex binder, and an alkyl-substituted trifunctional aziridine crosslinking agent are disclosed. An antistatic layer comprising a vanadium pentoxide colloidal gel is described in U.S. Pat. No. 4,203,769. U.S. Pat. Nos. 4,237,194; 4,308,332; and 4,526,706 describe antistats based on polyaniline salt-containing layers. Crosslinked vinylbenzyl quaternary ammonium polymer antistatic layers are described in U.S. Pat. No. 4,070,189. Conductive metal oxides including tin oxides mentioned previously with respect to reinforcing filler may also be employed to form an antistat layer beneath or over the magnetic recording layer.

These antistat layers are classified as process surviving and non-process surviving. This designation relates to whether or not the conductive properties of the antistat layer survives the processing solutions used in the development of the photographic film.

When non-process surviving antistat layers, such as, vanadium pentoxide layers are used and antistat properties are desired on the developed film, the antistat layer is overcoated with a barrier layer as described in U.S. Pat. Nos. 5,006,451 and 5,221,598.

It has surprisingly been found that when a magnetic recording layer free of reinforcing filler is applied over a non-process surviving antistat layer, the magnetic layer will inherently serve as a barrier layer for the antistat layer. However, a magnetic recording layer containing reinforcing filler does not function as well for this purpose. By crosslinking the binder, using the crosslinking agents set forth above, the superior barrier properties are re-established. Thus, crosslinking the polymeric binder of the magnetic recording layer is highly preferred especially when positioned over an antistat layer.

In still another embodiment, abrasive particles are also included in the magnetic recording layer in accordance with this invention. Abrasive particles are similar to the reinforcing fillers of this invention and include some of the same materials mentioned above, except they are much larger in size. The abrasive particles include those having a median particle diameter of from 0.2 to 0.4 $\mu$m and can be present in an effective amount to aid in the cleaning of the magnetic heads. Generally, the abrasive particles are present in an amount of from 1 to 20 percent by weight, and preferably 1 to 7 percent by weight based on the weight of the binder present. The most preferred abrasives are $\alpha$-$Al_2O_3$ and silicon dioxide.

As noted, photographic elements in accordance with this invention comprise at least one photosensitive layer. Such photosensitive layers can be image-forming layers containing photographic silver halides such as silver chloride, silver bromide, silver bromoiodide, silver chlorobromide and the like. Both negative and reversal silver halide elements are contemplated. For reversal films, the emulsion layers as taught in U.S. Pat. No. 5,236,817, especially Examples 16 and 21, are particularly suitable. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Additional useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 10 and 1000 mg/$m^2$ when uniformly distributed across the desired area of the photographic element will be sufficiently photographically transparent provided that the maximum particle size is less than about 1 micron. Particle concentrations less than about 10 mg/$m^2$ tend to be insufficient for magnetic recording purposes and particle concentrations greater than about 1000 mg/$m^2$ tend to be too dense for photographic purposes. Particularly useful particle concentrations are in the range of 20–70 mg/$m^2$. Concentrations of about 20 mg/$m^2$ have been found to be particularly useful in reversal films and concentrations of about 40 mg/$m^2$ are particularly useful in negative films.

The photographic elements according to this invention can contain one or more conducting layers such as antistatic layers and/or anti-halation layers such as such as described in Research Disclosure, Vol. 176, December 1978, Item 17643 to prevent undesirable static discharges during manufacture, exposure and processing of the photographic element. An antistat layer may be positioned at any suitable location in the photographic element, including the emulsion side of the support as well as the backside thereof. Antistatic layers conventionally used in color films have been found to be satisfactory for use herewith. Any of the antistatic agents set forth in U.S. Pat. No. 5,147,768, which is incorporated herein by reference may be employed. Preferred antistats include metal oxides, for example, tin oxide, antimony doped tin oxide and vanadium pentoxide.

The photographic elements according to this invention can be provided with a protective or lubricating layer, such as a wax layer, in or over the transparent magnetic recording layer. Suitable lubricants include silicone oil, silicones having polar groups, fatty acid-modified silicones, fluorine-containing silicones, fluorine-containing alcohols, fluorine-containing esters, polyolefins, polyglycols alkyl phosphates and alkali metal salts thereof, alkyl sulfates and alkali metal salts thereof, polyphenyl ethers, fluorine-containing alkyl sulfates and alkali metal salts thereof, monobasic fatty acids having 10 to 24 carbon atoms (which may contain unsaturated bonds or may be branched) and metal salts thereof (such as Li, Na, K and Cu), monovalent, divalent, trivalent, tetravalent, pentavalent and hexavalent alcohols having 12 to 22 carbon atoms (which may contain unsaturated bonds or may be branched), alkoxy alcohols having 12 to 22 carbon atoms, mono-, di- and tri-esters of monobasic fatty acids having 10 to 24 carbon atoms (which may contain unsaturated bonds or may be branched) and one of monovalent, divalent, trivalent, tetravalent, pentavalent and hexavalent alcohols having 2 to 12 carbon atoms (which may contain unsaturated bonds or may be branched), fatty acid esters of monoalkyl ethers of alkylene oxide polymers, fatty acid amides having 8 to 22 carbon atoms and aliphatic amines having 8 to 22 carbon atoms.

Specific examples of these compounds (i.e., alcohols, acids or esters) include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

The invention will be further illustrated by the following examples in which parts and percentages are given by weight unless otherwise specified.

EXAMPLES

EXAMPLE 1

A 88.9 μm (3.5 mil) polyethylene terephthalate support is coated with an aqueous latex of acrylonitrile/vinylidene chloride/acrylic acid at 129 mg/m² (12 mg/sq.ft.). A 1:1 weight ratio of silver doped vanadium pentoxide in an acrylonitrile/vinylidene chloride/acrylic acid binder is then coated at about 6.45 mg/m² (0.6 mg/sq.ft.). A cellulose diacetate/cellulose triacetate binder with magnetic particles and filler particles is cast to a thickness of about 1.2 μm over these layers from a dispersion composition as shown in Table 1. This dispersion is prepared by adding a dispersion of the magnetic particle, stabilized with Gafac PE 410 and cellulose triacetate, in methylene chloride and dibutyl phthalate to a cellulose diacetate solution in methylene chloride/acetone/methyl acetoacetate using a high shear mixer. A dispersion of the filler particles, previously ball milled to the median diameter set forth in the tables is added in a mixture of methylene chloride, acetone and methyl acetoacetate using a high shear mixer followed by addition of crosslinking agent. A coating aid is then added with low shear. Subsequently, the cast magnetic layer is overcoated with 26.9 mg/m² (2.5 mg/sq.ft.) of carnauba wax.

TABLE 1

| Dispersion Ingredient | Function | Weight Percent |
|---|---|---|
| Cellulose Diacetate | Binder | 1.65 |
| Cellulose Triacetate | Binder/Dispersion Stabilizer | 0.1 |
| Toda CSF-4085V2 | Magnetic Particle | 0.1 |
| Gafac PE510 | Surfactant | 0.005 |
| Dibutyl Phthalate | Grind Solvent | 0.2 |
| Degussa Aluminum Oxide C (0.06 μm) | Filler Particle | 1.65 |
| Mobay Mondur CB 75 | Crosslinking Agent | 0.247 |
| 3M FC-431 | Coating Aid | 0.015 |
| Methylene chloride | Solvent | 67.223 |
| Acetone | Solvent | 24.008 |
| Methyl acetoacetate | Solvent | 4.802 |

COMPARATIVE EXAMPLE C-1

A cellulose diacetate/cellulose triacetate binder with magnetic particles is cast to a thickness of about 1.2 μm onto subbed polyethylene terephthalate as described in Example 1 from a dispersion composition as shown in Table C-1. This dispersion is prepared as described in Example 1 except that filler particles are omitted.

TABLE C-1

| Dispersion Ingredient | Function | Weight Percent |
|---|---|---|
| Cellulose Diacetate | Binder | 1.913 |
| Cellulose Triacetate | Binder/Dispersion Stabilizer | 0.11 |
| Toda CSF-4085V2 | Magnetic Particle | 0.11 |
| Gafac PE510 | Surfactant | 0.005 |
| Dibutyl Phthalate | Grind Solvent | 0.215 |
| Mobay Mondur CB75 | Crosslinking Agent | 0.287 |
| 3M FC-431 | Coating Aid | 0.015 |
| Methylene chloride | Solvent | 68.142 |
| Acetone | Solvent | 24.336 |
| Methyl acetoacetate | Solvent | 4.867 |

EXAMPLE 2

A cellulose diacetate/cellulose triacetate binder with magnetic particles, filler particles, and abrasive particles is cast to a thickness of about 1.2 μm onto subbed polyethylene terephthalate as described in Example 1 from a dispersion composition as shown in Table 2. The dispersion is prepared as in Example 1 except that the filler particles dispersed in methyl acetoacetate with a dispersing agent; abrasive particles dispersed in methylene chloride with a surfactant and tin octoate crosslinking catalyst are added prior to casting the film.

TABLE 2

| Dispersion Ingredient | Function | Weight Percent |
|---|---|---|
| Cellulose Diacetate | Binder | 1.5 |
| Cellulose Triacetate | Binder/Dispersion Stabilizer | 0.129 |
| Toda CSF-4085V2 | Magnetic Particle | 0.129 |
| Gafac PE510 | Surfactant | 0.006 |
| Gafac RE610 | Surfactant | 0.003 |
| Dibutyl Phthalate | Grind Solvent | 0.267 |
| Sumitomo AKP-50 (0.35 μm) | Abrasive Particle | 0.035 |
| 3M FC-431 | Coating Aid | 0.136 |
| Mobay Mondur CB75 | Crosslinking Agent | 0.015 |
| Solsperse 24000 | Dispersing Agent | 0.375 |
| Tin Octoate | Crosslinking Catalyst | 0.27 |
| Degussa Aluminum Oxide C (0.04 μm) | Filler Particle | 1.35 |
| Methylene chloride | Solvent | 66.428 |
| Acetone | Solvent | 23.724 |
| Methyl acetoacetate | Solvent | 5.655 |

EXAMPLE 3

A cellulose diacetate/cellulose triacetate binder with magnetic particles and filler particles is cast to a thickness of about 1.2 μm onto subbed polyethylene terephthalate as described in Example 1 from a dispersion composition as shown in Table 3. The dispersion is prepared as in Example 1 except the polyisocyanate crosslinking agent is omitted.

TABLE 3

| Dipersion Ingredient | Function | Weight Percent |
|---|---|---|
| Cellulose Diacetate | Binder | 2.7 |
| Cellulose Triacetate | Binder/Dispersion Stabilizer | 0.16 |
| Toda CSF-4085V2 | Magnetic Particle | 0.16 |
| Gafac PE510 | Surfactant | 0.008 |
| Dibutyl Phthalate | Grind Solvent | 0.312 |
| Degussa Aluminum Oxide C (0.07 μm) | Filler Particle | 2.2 |
| 3M FC-431 | Coating Aid | 0.015 |
| Methylene chloride | Solvent | 66.112 |
| Acetone | Solvent | 23.611 |
| Methyl acetoacetate | Solvent | 4.722 |

Evaluation Method

Haze Measurement

The haze of lubricated cast layers is evaluated with an XL-211 Hazegard System by measuring transmitted light on a percentage basis for any light deviating by more than 2.5° from the incident beam.

Rotating Drum Friction Test

The running durability of the lubricated cast layers is evaluated using a Steinberg Rotating Drum Friction Tester. The initial (breakaway) friction coefficient and final (running) friction coefficient are measured under 50 gram load and drum speed of 30 cm/sec at 23° C. and 50% relative humidity. The running friction is measured after 10 minutes. The Rotating Drum Friction Test is sensitive to surface lubrication.

Head Clogging Test

Head clogging of the lubricated cast layers is evaluated using a Honeywell 7600 reel-to-reel transport operating at a tape speed of 3.75 inches per second and a tape tension of 13 ounces. Output signal characterization is performed using a Tektronix 7854 digitizing oscilloscope. Head clogging is determined to have occurred if the peak-to-peak output voltage decreased along the length of tape tested.

Resistivity

Resistivity of as coated (raw) and processed layers is evaluated by applying 500 volts DC between two cells, each containing distilled water, which are bridged by a 35 mm by 254 mm sample strip and measuring the current. The resistivity is then obtained from the resistance derived from Ohm's Law and the sample dimensions. The C-41 process is used for the samples that are processed.

TABLE 4

| Example Number | Haze | Rotating Drum Friction Initial | Running | Head Clogging | Resistivity (log $\Omega$ − cm) Raw | Processed |
|---|---|---|---|---|---|---|
| 1 | 4.4 | 0.16 | 0.03 | no | 8.99 | 9.98 |
| C-1 | 6.0 | >0.76 | >0.76 | yes | 8.41 | 8.63 |
| 2 | 9.5 | 0.15 | 0.05 | no | 8.20 | 8.30 |
| 3 | 4.9 | 0.16 | 0.05 | no | 9.65 | 12.66 |

As is apparent from the results in Table 4, the invention offers excellent resistance to abrasion and scratching, excellent running durability, and improved head clogging performance.

EXAMPLES 4–6 AND COMPARATIVE EXAMPLE C-2

A color photographic recording material for color negative development is prepared by applying the following layers in the given sequence to the opposite side of each of the supports of Examples 1–3 and Comparative Example 1 respectively. The quantities of silver halide are given in grams (g) of silver per m². The quantities of other materials are given in g per m².

Layer 1 {Antihalation Layer} black colloidal silver sol containing 0.236 g of silver, with 2.44 g gelatin.

Layer 2 {First (least) Red-Sensitive Layer} Red sensitized silver iodobromide emulsion [1.3 mol % iodide, average grain diameter 0.55 microns, average thickness 0.08 microns] at 0.49 g, red sensitized silver iodobromide emulsion [4 mol % iodide, average grain diameter 1.0 microns, average thickness 0.09 microns] at 0.48 g, cyan dye-forming image coupler C-1 at 0.56 g, cyan dye-forming masking coupler CM-1 at 0.033 g, BAR compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming masking coupler CM-1 at 0.022 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.13 g, cyan dye-forming masking coupler CM-1 at 0.033 g, DIR compound D-1 at 0.024 g, DIR compound D-2 at 0.050 g, with gelatin at 1.36 g.

Layer 5 {Interlayer} Yellow dye material YD-1 at 0.11 g and 1.33 g of gelatin

Layer 6 {First (least) Green-Sensitive Layer} Green sensitized silver iodobromide emulsion [1.3 mol % iodide, average grain diameter 0.55 microns, average grain thickness 0.08 microns] at 0.62 g, green sensitized silver iodobromide emulsion [4 mol % iodide, average grain diameter 1.0 microns, average grain thickness 0.09 microns] at 0.32 g, magenta dye-forming image coupler M-1 at 0.24 g, magenta dye-forming masking coupler MM-1 at 0.067 g with gelatin at 1.78 g.

Layer 7 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.091 g, magenta dye-forming masking coupler MM-1 at 0.067 g, DIR compound D-1 at 0.024 g with gelatin at 1.48 g.

Layer 8 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.0.72 g, magenta dye-forming masking coupler MM-1 at 0.056 g, DIR compound D-3 at 0.01 g, DIR compound D-4 at 0.011 g, with gelatin at 1.33 g.

Layer 9 (Interlayer) Yellow dye material YD-2 at 0.11 g with 1.33 g gelatin.

Layer 10 {First (less) Blue-Sensitive Layer} Blue sensitized silver iodobromide emulsion [1.3 mol % iodide, average grain diameter 0.55, average grain thickness 0.08 microns] at 0.24 g, blue sensitized silver iodobromide emulsion [6 mol % iodide, average grain diameter 1.0 microns, average grain thickness 0.26 microns] at 0.61 g, yellow dye-forming image coupler Y-1 at 0.29 g, yellow dye forming image coupler Y-2 at 0.72 g, cyan dye-forming image coupler C-1 at 0.017 g, DIR compound D-5 at 0.067 g, BAR compound B-1 at 0.003 g with gelatin at 2.6 g.

Layer 11 {Second (more) Blue-Sensitive Layer} Blue sensitized silver iodobromide emulsion [4 mol % iodide, average grain diameter 3.0 microns, average grain thickness 0.14 microns] at 0.23 g, blue sensitized silver iodobromide emulsion [9 mol % iodide, average grain diameter 1.0 microns] at 0.59 g, yellow dye-forming image coupler Y-1 at 0.090 g, yellow dye-forming image coupler Y-2 at 0.23 g, cyan dye-forming image coupler C-1 0.022 g, DIR compound D-5 at 0.05 g, BAR compound B-1 at 0.006 g with gelatin at 1.97 g.

Layer 12 {Protective Layer} 0.111 g of dye UV-1, 0.111 g of dye UV-2, unsensitized silver bromide Lippman emulsion at 0.222 g, 2.03 g.

This film is hardened at coating with 2% by weight to total gelatin of hardener H-1. Surfactants, coating aids, scavengers, soluble absorber dyes and stabilizers are added to the various layers of this sample as is commonly practiced in the art.

The formulas for the component materials are as follows:

C-1:

-continued
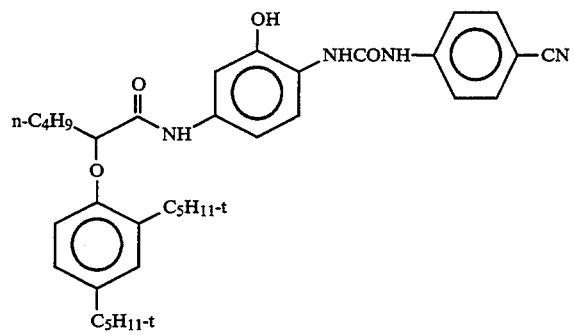
CM-1
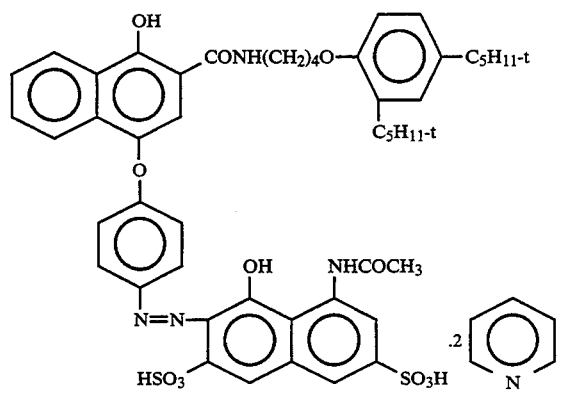
B-1
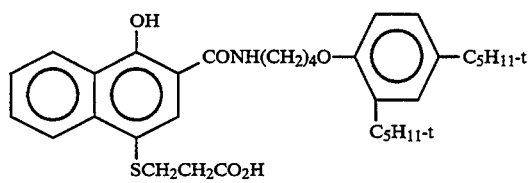
D-1:
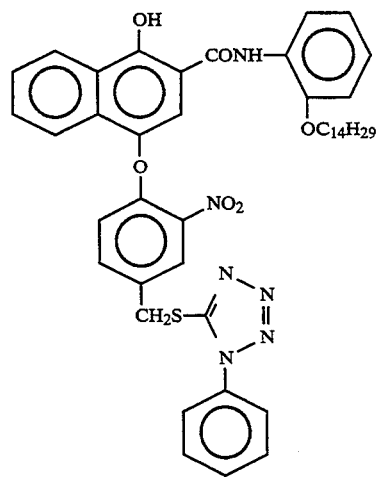
D-2
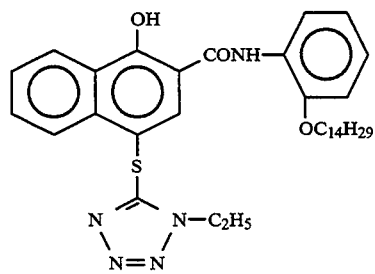
D-3:
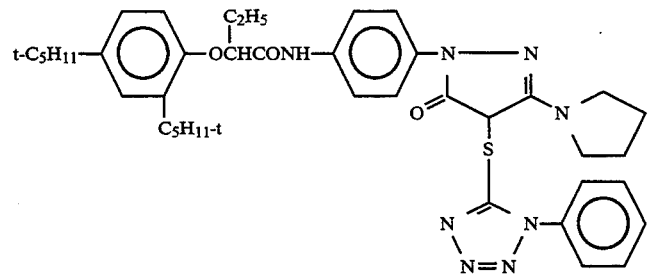
D-4                                   D-5:

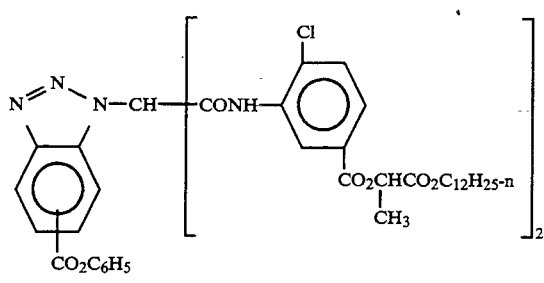
MM-1
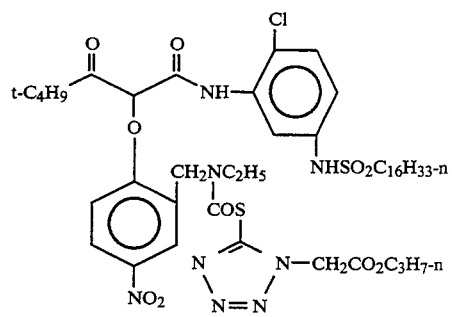
Y-1:
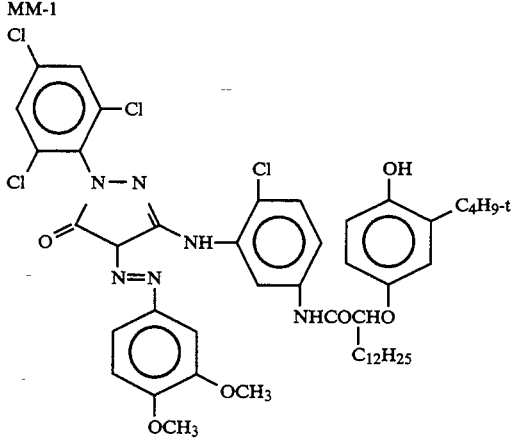
Y-2:
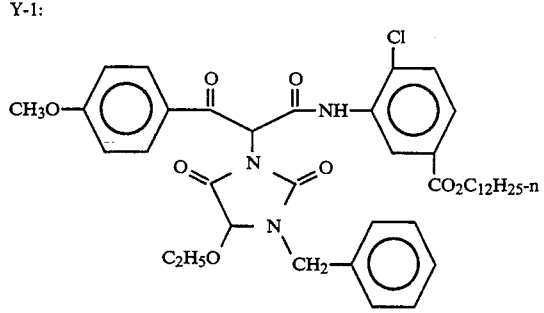
M-1:
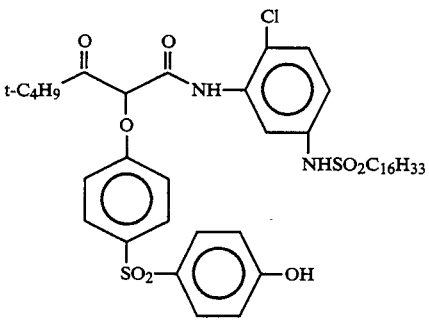
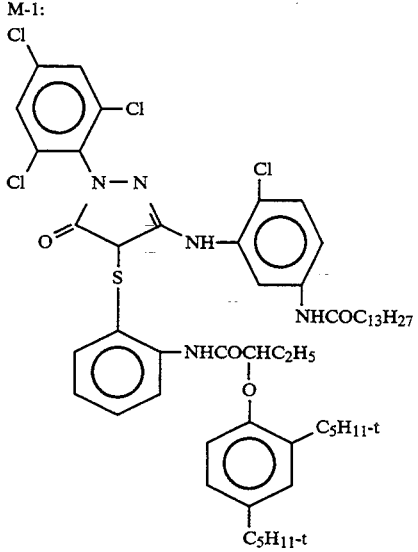
YD-1:
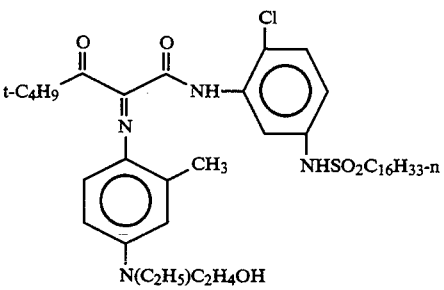
YD-2:
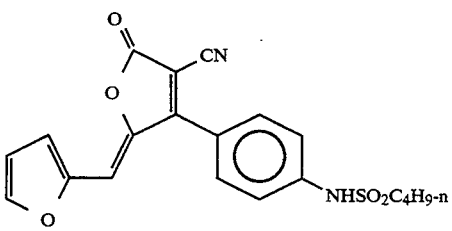
UV-1:  UV-2:

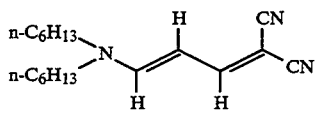

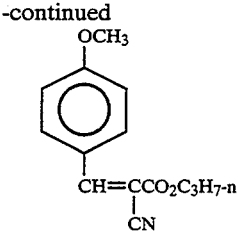

H-1:
CH$_2$(SO$_2$CH=CH$_2$)$_2$

The results of Examples 4–6 and C-2 are comparable in each instance to those reported for Examples 1–3 and C-1 respectively.

The quantity of the reinforcing filler particles, even at the highest levels do not interfere with the optical qualities of the photographic element.

The invention has been described in detail with particular reference to preferred embodiments thereof, but it will be understood that variations and modifications can be effected within the spirit and scope of the invention.

What is claimed is:

1. A photographic element comprising a support having provided thereon a light-sensitive layer and a transparent magnetic recording layer, the magnetic recording layer comprising a transparent polymeric binder, ferro-magnetic particles and reinforcing filler particles, the magnetic particles having a surface area greater than 30 m$^2$/gm, a coverage of from about $1\times10^{-11}$ mg/$\mu$m$^3$ to about $1\times10^{-10}$ mg/$\mu$m$^3$ and being present in an amount of from about 2.5 to about 10 percent by weight based on the weight of the binder, the filler particles having a median diameter of less than 0.15 $\mu$m, a Mohs hardness of at least 6 and being present in the transparent magnetic layer in an amount of from about 20 to about 300 percent by weight based on the weight of the polymeric binder.

2. The photographic element of claim 1 wherein the filler particles are present in an amount of from 50 to 120 percent by weight.

3. The photographic element of claim 1 wherein the filler particles are present in an amount of from 65 to 85 percent by weight.

4. The photographic element of claim 1 wherein the filler particles have a median diameter of from 0.04 to 0.15 $\mu$m.

5. The photographic element of claim 1 wherein the filler particles have a median diameter of 0.04 to 0.1 $\mu$m.

6. The photographic element of claim 1 wherein the filler particles have a median diameter of 0.04 to 0.08 $\mu$m.

7. The photographic element of claim 1 wherein abrasive particles having a median diameter of 0.2 to 0.4 $\mu$m are included in the transparent magnetic recording layer.

8. The photographic element of claim 7 wherein the abrasive particles are present in an amount of from 1 to 20 weight percent based on the weight of the binder.

9. The photographic element of claim 7 wherein the abrasive particles are present in an amount of from 1 to 7 weight percent based on the weight of the binder.

10. The photographic element of claim 7 wherein the abrasive particles are alpha aluminum oxide.

11. The photographic element of claim 7 wherein the abrasive particles are silicon dioxide.

12. The photographic element of claim 1 wherein the polymeric binder is a cellulose ester, a polyurethane or a vinyl polymer.

13. The photographic element of claim 12 wherein the polymeric binder is crossed-linked.

14. The photographic element of claim 13 wherein the polymeric binder is cross-linked with an isocyanate.

15. The photographic element of claim 12 wherein the polymeric binder is a cellulose ester.

16. The photographic element of claim 15 wherein the cellulose ester is a cellulose acetate.

17. The photographic element of claim 16 wherein the cellulose acetate is cellulose diacetate.

18. The photographic element of claim 17 wherein the cellulose diacetate is cross-linked with a polyisocyanate.

19. The photographic element of claim 12 wherein the polymeric binder is a polyurethane.

20. The photographic element of claim 12 wherein the polymeric binder is a vinyl polymer.

21. The photographic element of claim 1 wherein the filler particles are gamma aluminum oxide.

22. The photographic element of claim 1 wherein the light-sensitive layer is on one side of the support and the transparent magnetic recording layer is on the opposite side of the support.

23. The photographic element of claim 22 wherein the binder of the transparent magnetic recording layer is crosslinked.

24. The photographic element of claim 22 wherein an antistat layer is disposed between the magnetic recording layer and the support.

25. The photographic element of claim 22 wherein an antistat layer is disposed between the support and the light-sensitive layer.

26. A transparent magnetic recording layer comprising a transparent polymeric binder, ferro-magnetic particles and reinforcing filler particles, the magnetic particles having a surface area greater than 30 m$^2$/gm, a coverage of from about $1\times10^{-11}$ mg/$\mu$m$^3$ to about $1\times10^{-10}$ mg/$\mu$m$^3$ and being present in an amount of from about 2.5 to about 10 percent by weight based on the weight of the binder, the filler particles having a median diameter of less than 0.15 $\mu$m, a Mohs hardness of at least 6 and being present in an amount of from 20 to 300 percent by weight based on the weight of the polymeric binder.

27. The transparent magnetic recording layer of claim 26 wherein the filler particles are present in an amount of from 50 to 120 percent by weight.

28. The transparent magnetic recording layer of claim 26 wherein the filler particles are present in an amount of from 65 to 85 percent by weight.

29. The transparent magnetic recording layer of claim 26 wherein the filler particles have a median diameter of from 0.04 to 0.15 μm.

30. The transparent magnetic recording layer of claim 26 wherein the filler particles have a median diameter of from 0.04 to 0.1 μm.

31. The transparent magnetic recording layer of claim 26 wherein the filler particles have a median diameter of from 0.04 to 0.08 μm.

32. The transparent magnetic recording layer of claim 26 wherein the polymeric binder is a cellulose ester, a polyurethane or a vinyl polymer.

33. The transparent magnetic recording layer of claim 32 wherein the polymeric binder is crossed-linked.

34. The transparent magnetic recording layer of claim 33 wherein the polymeric binder is cross-linked with an isocyanate.

35. The transparent magnetic recording layer of claim 32 wherein the polymeric binder is a cellulose ester.

36. The transparent magnetic recording layer of claim 35 wherein the cellulose ester is a cellulose acetate.

37. The transparent magnetic recording layer of claim 36 wherein the cellulose acetate is cellulose diacetate.

38. The transparent magnetic recording layer of claim 36 wherein the cellulose diacetate is cross-linked with a polyisocyanate.

39. The transparent magnetic recording layer of claim 32 wherein the polymeric binder is a polyurethane.

40. The transparent magnetic recording layer of claim 32 wherein the polymeric binder is a vinyl polymer.

41. The transparent magnetic recording layer of claim 26 wherein the filler particles are gamma aluminum oxide.

42. The transparent magnetic recording layer of claim 26 wherein abrasive particles having a median diameter of 0.2 to 0.4 μm are included.

43. The transparent magnetic recording layer of claim 42 wherein the abrasive particles are present in an amount of from 1 to 20 weight percent based on the weight of the binder.

44. The transparent magnetic recording layer of claim 43 wherein the abrasive particles are present in an amount of from 1 to 7 weight percent.

45. The transparent magnetic recording layer of claim 42 wherein the abrasive particles are alpha aluminum oxide.

46. The transparent magnetic recording layer of claim 42 wherein the abrasive particles are silicon dioxide.

* * * * *